United States Patent [19]
Goglio et al.

[11] Patent Number: 5,345,972
[45] Date of Patent: Sep. 13, 1994

[54] METHOD FOR REPAIRING LOCAL DAMAGE TO PIPELINES BY APPLYING CLADDING WITH AN INTERPOSED PROTECTIVE SHEATH

[75] Inventors: Alfeo Goglio, Melegnano; Valentino Pistone, Bollate, both of Italy

[73] Assignee: Snam S.p.A., Milan, Italy

[21] Appl. No.: 31,837

[22] Filed: Mar. 16, 1993

[30] Foreign Application Priority Data

Mar. 18, 1992 [IT] Italy .................. MI92 A 000626

[51] Int. Cl.⁵ .................................. F16F 55/18
[52] U.S. Cl. .................................. 138/99; 138/167
[58] Field of Search ............. 138/99, 97, 98, 167; 285/373, 910, 45, 419

[56] References Cited
U.S. PATENT DOCUMENTS

| | | |
|---|---|---|
| 1,568,268 | 1/1926 | Clark et al. . |
| 1,877,094 | 9/1932 | Walborn .................. 138/99 |
| 1,940,729 | 12/1933 | Pfefferle . |
| 1,964,642 | 6/1934 | McCoy . |
| 2,188,302 | 1/1940 | Pfefferle . |
| 2,785,912 | 3/1957 | Risley et al. . |
| 3,002,772 | 10/1961 | Schustack . |
| 3,396,753 | 8/1968 | Foster et al. .................. 138/99 |
| 3,954,288 | 5/1976 | Smith .................. 138/99 |
| 4,111,234 | 9/1978 | Wells et al. .................. 138/99 |
| 4,603,893 | 8/1986 | Takahashi . |
| 4,673,122 | 6/1987 | Dubey .................. 138/99 |

FOREIGN PATENT DOCUMENTS

| | | |
|---|---|---|
| 2658583 | 8/1991 | France . |
| 2080475 | 2/1982 | United Kingdom . |
| 2197420 | 5/1988 | United Kingdom . |

*Primary Examiner*—Timothy F. Simone
*Assistant Examiner*—Patrick F. Brinson
*Attorney, Agent, or Firm*—Oblon, Spivak, McClelland, Maier & Neustadt

[57] ABSTRACT

A method for repairing local damage to pipelines by applying a cylindrical cladding consisting of two cylindrical half-shells welded together to create an interspace, which is sealed by applying gaskets forced against the circular edges of the cladding, after which resin is injected into the interspace at high pressure.

7 Claims, 4 Drawing Sheets

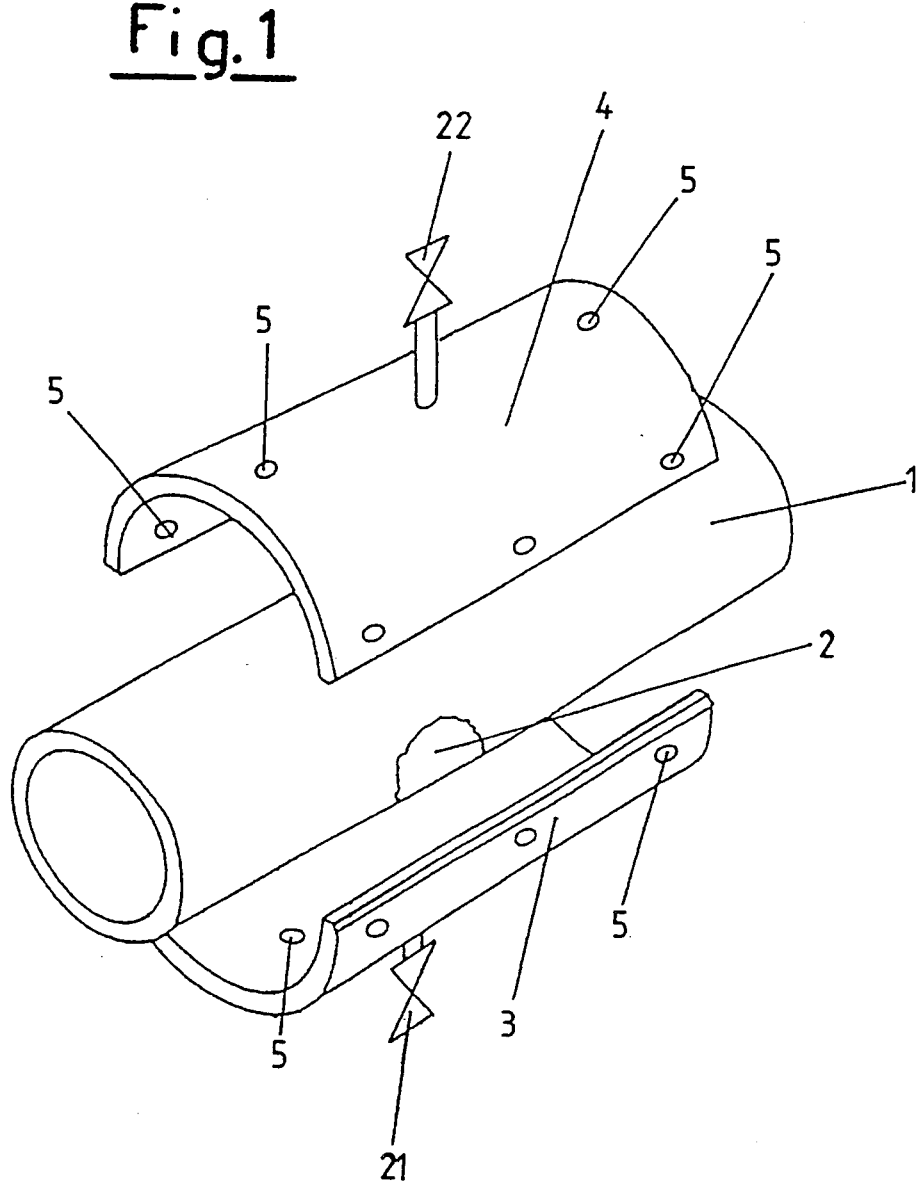

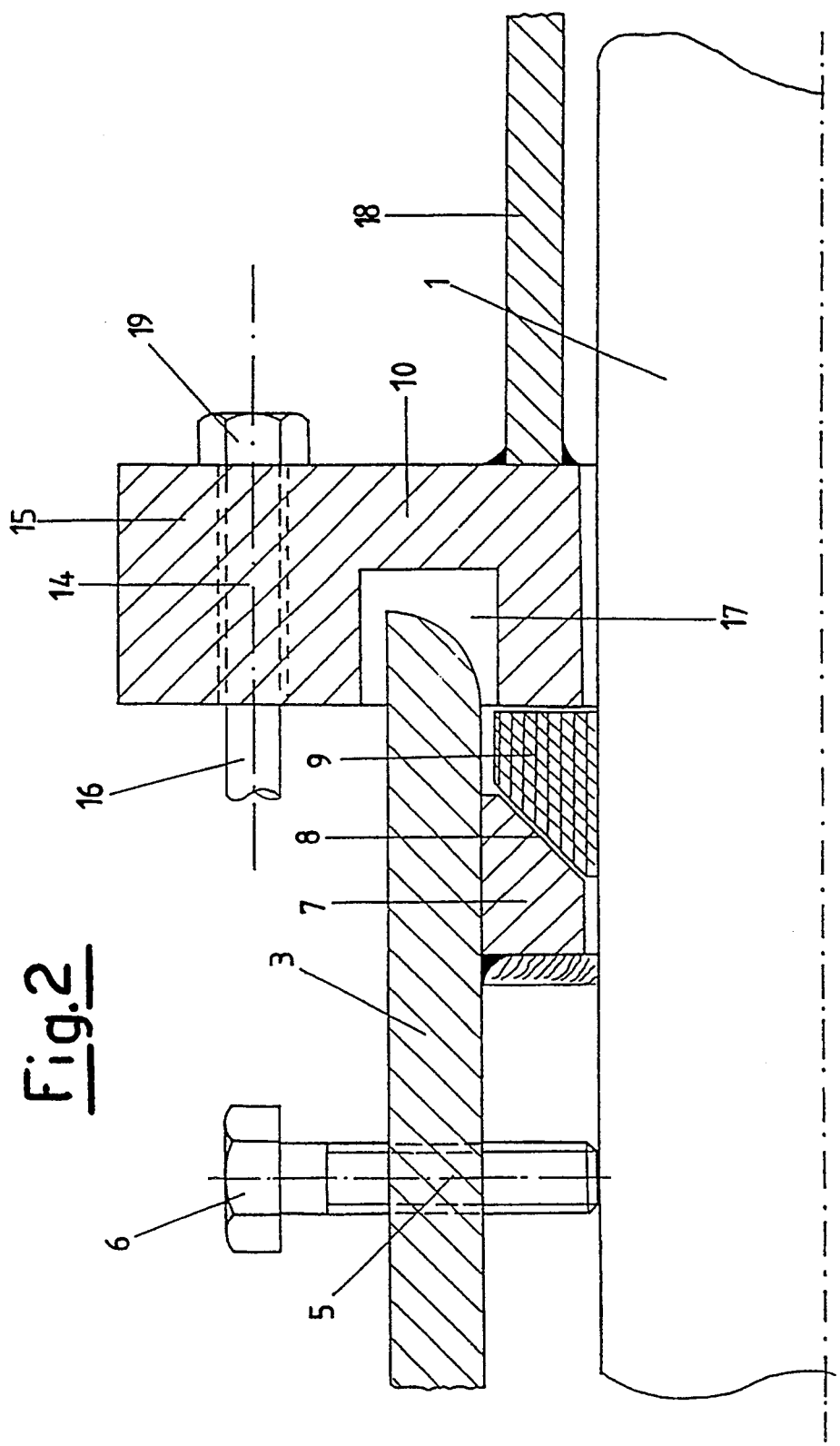

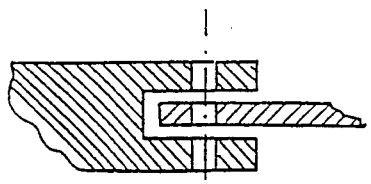
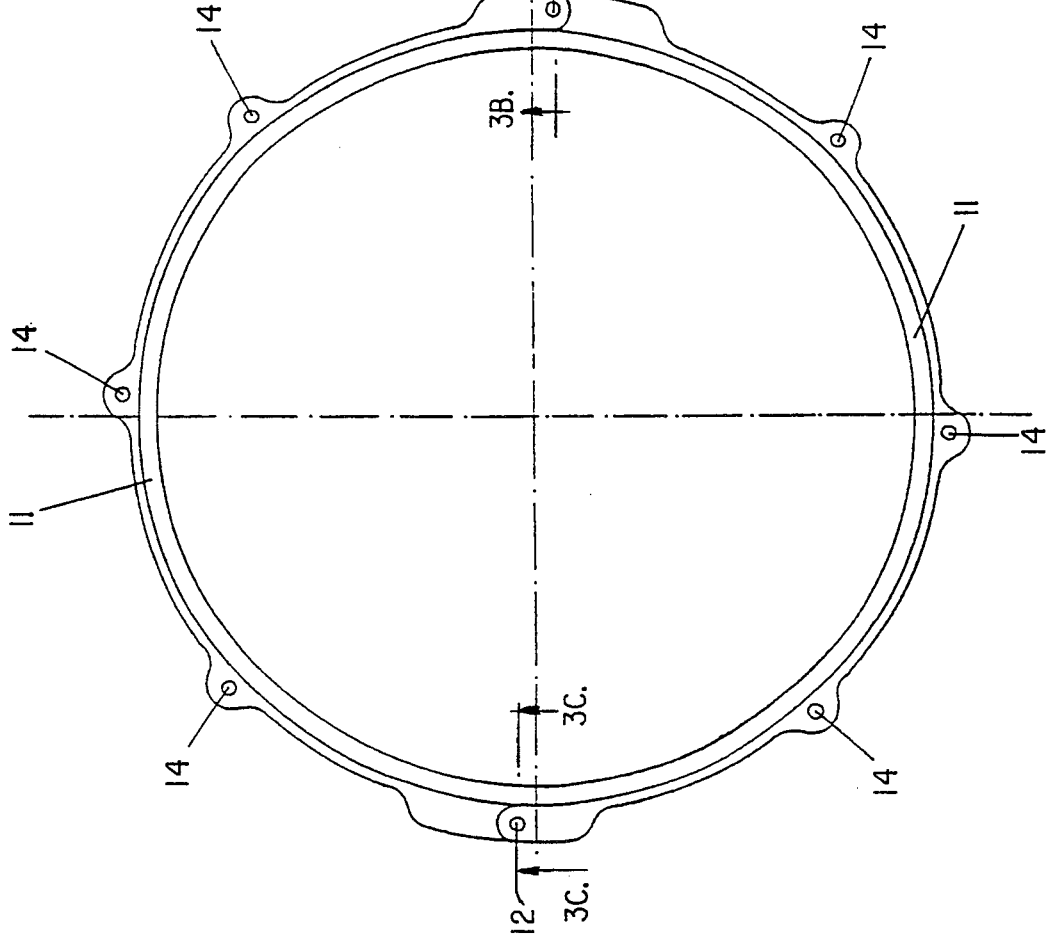
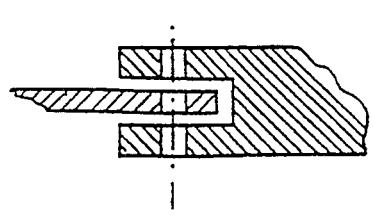

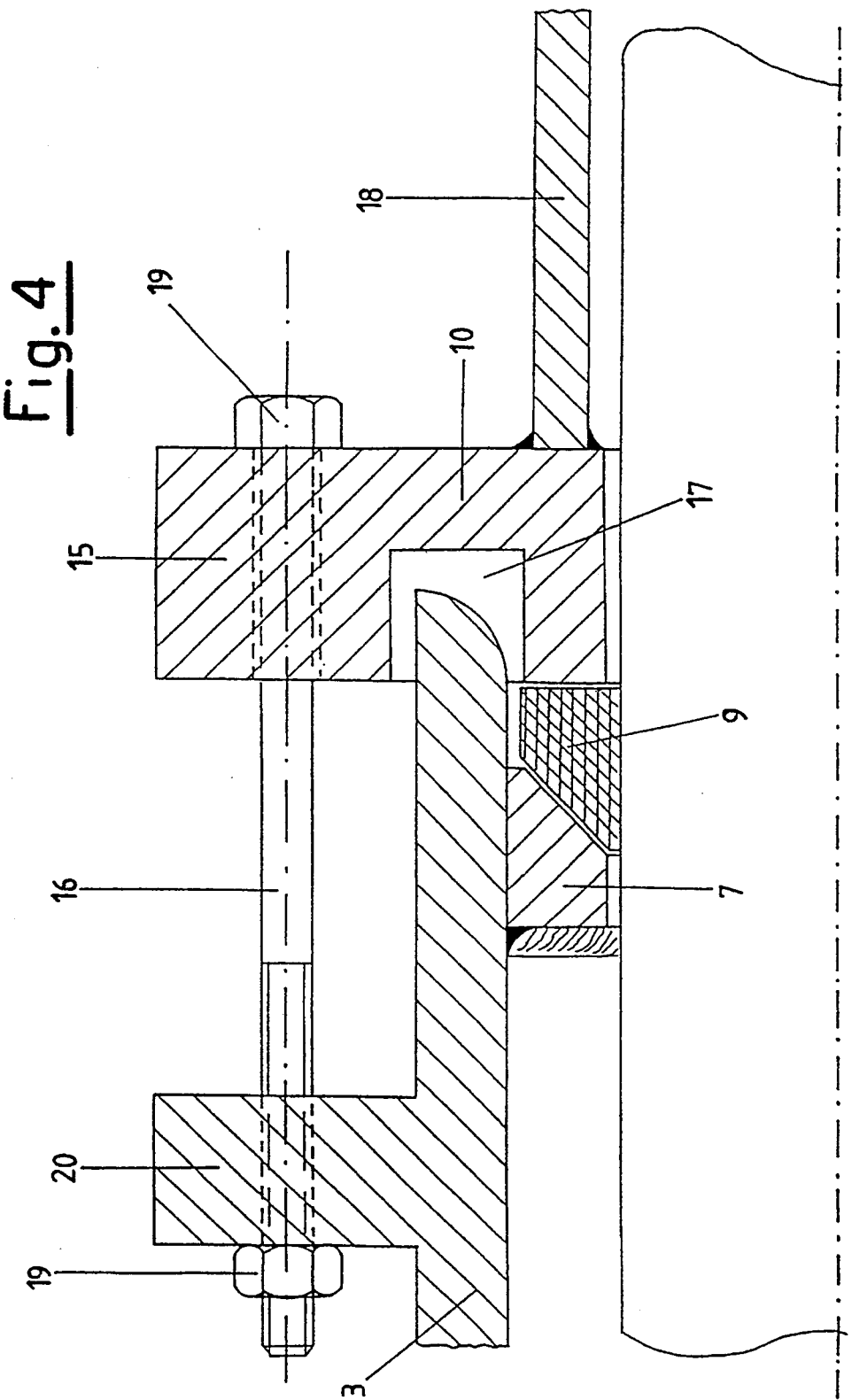

METHOD FOR REPAIRING LOCAL DAMAGE TO PIPELINES BY APPLYING CLADDING WITH AN INTERPOSED PROTECTIVE SHEATH

BACKGROUND OF THE INVENTION

1. Field of the Invention

This invention relates to the repair of fluid transporting pipelines such as water, gas, oil or other pipelines for civil and industrial use.

2. Discussion of the Related Art

These pipelines are generally formed by welding together lengths of metal pipe, the continuous pipeline assembled in this manner being laid in its final seat, generally consisting of a sufficiently deep trench, and then covered in order to recreate the pre-existing environment and hence not hinder human activity on its surface.

The assembled continuous pipeline is provided with protection against wet corrosion, as the environment in which the underground pipeline lies is very aggressive towards ferrous materials, this protection generally being in the form of protective coverings and cathodic protection with an applied current, and being provided with a monitoring circuit and frequently inspected. The integrity and preservation of the pipeline during its entire operating life are very important, not only because of its high construction cost, but also to prevent danger, pollution or serious disturbance to users.

This protection is often insufficient to protect an underground pipeline for the required time for the following reasons. The covering materials are not free of a certain porosity and a certain degradation with time, and during the application of the covering and the laying and burying of the pipeline slight damage to and/or separation of the covering can occur, and which can subsequently trigger corrosion phenomena even after a considerable time. Natural phenomena, such as earthquakes, collapsing and landslips, or accidental events deriving from human activity on the surface, can cause local damage to the pipeline. Various methods for repairing the damaged portions have been proposed and practiced in the known art.

The most radical repair method consists of replacing the damaged portion by removing the damaged metal pipe piece and inserting a new pipe piece in its place, so basically repeating the pipeline construction procedure. This method has considerable drawbacks because it is very difficult and costly, and because it puts the entire pipeline out of operation for a prolonged time. In a less radical but rather questionable method it has been proposed to make the repair by applying a reinforcement to the outside by welding on a piece of metal plate of the same shape as the damaged part or by directly inserting new material into the damaged region to restore the thickness of the pipeline.

Another handy repair method of more widespread use is to apply two cylindrical steel half-shells to the outside of the damaged portion of the pipeline and weld them together along their generators, to hence create a metal shell about the damaged portion. The interspace between the pipeline and the two half-shells, these being known as cladding, is sealed at its two ends with a cement mix. After waiting for the cement mix to set, a resin comprising two or more components is injected into the interspace of circular ring cross-section created between the pipeline and the welded cladding, and is allowed to harden within the interspace to produce a sheath which creates continuity between the inner damaged pipe piece and the outer shell, so that the force due to the pressure within the pipeline is discharged onto the shell.

This method has considerable drawbacks due both to the waiting time for the cement to set and to the fact that having used a cement mix for sealing, the resin components cannot be injected at high pressure. If the resin were to be injected at high pressure, the cement seal would not be able to remain in position and would be pushed outwards to allow the resin to escape. Injecting the resin at insufficient pressure can result in incomplete filling of the interspace and in addition this method cannot be relied on to produce continuity between the damaged pipe piece and the outer shell because of the fact that resins generally shrink during polymerization and hardening, even if inert fillers have been added, with the result that the force deriving from the pressure within the pipeline is not completely discharged onto the shell. This discontinuity between the shell and resin sheath is due to this shrinkage phenomenon.

SUMMARY OF THE INVENTION

The pipeline repair method according to the present invention is still based on the principle of using outer cladding not welded to the pipeline, but avoids the problems arising from the discontinuities between the pipeline and the cladding which occur in the known art.

Accordingly, the present invention relates to a method for repairing local damage to pipelines by applying a cylindrical cladding or a cup comprising two cylindrical half-shells welded together to create an interspace, which is sealed by applying gaskets forced against circular edges of the cladding or cup, after which resin is injected into the interspace at high pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a perspective view of a pipeline and two cylindrical half-shells of the present invention;

FIG. 2 is a detailed view of a portion of a half-shell;

FIG. 3 is a view of a flange utilized in the present invention; and

FIG. 4 is a further embodiment of a half-shell arrangement of the present invention.

DETAILED DESCRIPTION OF THE PREFERRED EMBODIMENTS

The advantages of the pipeline repair method of the present invention will be more apparent from the description of a typical embodiment thereof given hereinafter by way of non-limiting example with reference to FIGS. 1 to 4.

The pipeline 1 comprising local damage 2, such as a corrosion crater due to infiltration below the protective covering, is exposed by removing the ground around it, and its protection covering is removed to the extent sufficient for the repair. The pipeline surface is cleaned, degreased and sanded to achieve bare metal in order to ensure good resin adhesion. The two cylindrical steel half-shells are then positioned, preferably centered about the damage 2.

The inner diameter of the two half-shells is slightly greater than the outer diameter of the pipeline, indicatively by 20–50 mm, to enable a resin sheath of 10–25 mm thickness to be created. The inner surfaces of the two half-shells or cladding are treated in the same way as the outer surface of the pipeline to obtain the same adhesion between the resin and the metal. The two half-shells are then joined together along their edges to create a cylindrical cup about the pipe. The joint can be of removable mechanical type, for example using studs and nuts, but in its more common implementation, which is described herein by way of non-limiting example, a permanent welded joint is used. The lower half-shell 3 is supported by supports, not shown in the figures, and the upper half-shell 4 is positioned with the horizontal edges to be welded together in mutual contact. These edges are shaped to receive a weld seam using welding metal. The two half-shells are then welded together to form the cylindrical metal cup about the pipe. The interspace is then cleaned with a compressed air blast. This preparation is common to the stated method of the known art.

According to a preferred embodiment of the invention, threaded holes 5 are distributed over the surface of the two half-shells to allow the insertion of bolts 6 for centering the cup about the pipe, in order to obtain an interspace between the cup and pipeline which is of uniform thickness. Two circular half-rings 7 are welded to the interior of the half-shells 3 and 4 in correspondence with the ends of the two half-shells, as shown in the detailed view of FIG. 2. Their outer face 8 is inclined as a cone with its vertex towards the interior of the cup formed by the two half-shells 3 and 4.

At both ends of the cup, against the ring formed by the two half-rings 7, there is provided a gasket 9 in which at least that surface facing the ring is inclined conically to match the surface 8. It is preferably prepared from a linear section bar of rubber or another elastic material, which is cut to size and wrapped around the pipeline 1, then joined together at its ends with adhesive and pushed into contact with 8. To improve the gasket seal, a thin layer of resin can be spread over the surface of the pipeline 1 where the gasket is positioned. Two flanges 10, shown in detail in FIGS. 2 and 3 and having a slightly greater diameter than the pipeline 1, are placed against the ends of the cup. The two flanges each consist of two half-flanges 11 which are closed in the manner of jaws about the pipeline and connected together by bolts passing through the end holes 12 and locked with a nut and locking nut. The two outer flanges 10 are provided with a plurality of holes 14 in their projecting edge 15 for the insertion of threaded tie bars 16. They are preferably provided with a recess 17 of circular ring shape in their inner face in a position corresponding with the edge of the cup, and with a centering ring 18 on the opposite face.

After the two flanges 10 have been mounted they are forced to clamp the two gaskets 9 by tightening the nuts 19 screwed onto the bars 16, preferably using dynamometric spanners to balance the pulling forces so that the flange is always maintained perpendicular to the axis of the pipeline. The tightening action compresses the gaskets 9 both against the surface 8 and against the pipeline 1 by the effect of the inclined lead-in. The seal is improved by the possible interposing of a thin layer of resin between the pipeline and the gasket and which, after tightening, sets against the pipeline and the inner face of the gasket. FIG. 4 shows an alternative embodiment of the tightening device for the gaskets 9, which may be preferable for repairing pipeline portions requiring longer cups, or curved pipeline portions. In this embodiment the half-shells 3 and 4 are provided near their ends with semicircular backing flanges 20 comprising through holes corresponding with those of the outer flanges 10. Between the flange and backing flange there are provided shorter threaded bars, on which the tightening nuts are screwed.

After tightening, the centering bolts 6 are removed, the holes 5 are closed with threaded plugs and the cup is ready for injection of the resin sheath. Before injection, it should be checked, for example with compressed air of 0.5–1.5 MPa pressure, that the interspace is sealed, and if leakages occur the threaded bars 16 should be further tightened to further compress the gaskets. In the lowest part of the lower half-shell 3 there is a valved connector 21, screwed for example into a threaded hole analogous to the holes 5, for connecting the resin mixture injection pump, not shown in the figures, which is provided for example with a number of vessels containing the resin components which are to be mixed together at the moment of injection. In the highest part of the upper half-shell 4 there is a valved connector 2,2 for venting the air expelled by the injected resin. The valved connectors 21 and 22 can also be used for the preliminary interspace seal tests. The resin injection, which constitutes one of the characterising parts of the method according to the invention, comprises the following stages.

Various types of commercially available resins can be used for the purpose. By way of example, the following commercially available resin types can be used: liquid epoxy resins used in combination with a preferably amine-type hardener, or acrylic, vinyl or allyl liquid monomers used in combination with a polymerization catalyst able to generate free radicals, and normally chosen from organic percarbonates, peroxides and hydroperoxides, polymerization being effected within the interspace. According to a preferred embodiment of the invention, to limit shrinkage or improve the mechanical characteristics of the formed polymer sheath, finely divided inert inorganic materials such as powdered marble can be added to the component mixtures.

At the commencement of the injection operation the injection pump vessels are filled with the products for preparing the resin mixture, and the pump is connected to the lower connector 21. For field use, the injection pump is normally operated by compressed air generated by a motor-driven compressor available in the mobile repair shop. The upper vent valve 22 is opened and the pump started to commence injection of the resin mixture. When the resin begins to escape from the upper valve 22, this valve is closed. Resin injection is continued until the pressure of the pressure gauge on the pump or sealed cup reaches a substantial gauge pressure, indicatively of the order of 20–60 bar and preferably between 30 and 45 bar. This pressure is very important for the correct formation of the resin sheath. By this means, in addition to achieving complete filling of the interspace, the cup wall is put under substantial tension and the pipeline wall under compression. During resin setting and consolidation, its shrinkage is adequately compensated by the release of the cup tension stresses and pipeline compression stresses, so allowing these parts to return to their original configuration and maintaining the coaxial metal surfaces of the cup and pipeline always in contact with the resin sheath being consolidated, so that when hardening is complete there is perfect continuity between the outer cup and the pipeline.

After reaching the required gauge pressure, the injection pump is halted and the lower valve 21 closed. The pump is disconnected and cleaned, and the resin left to harden for the prescribed time. After the resin has hardened the connectors can be removed, closing the holes with threaded plugs, and the flanges 10 and tie bars 16 can also be dismantled and removed, leaving on the repaired pipeline 1 the cup formed from the welded half-shells 3 and 4 and the gasket 9, which is retained by the resin. New protection covering is applied to the pipeline, which can then be reburied.

The applied cup must be connected to the pipeline cathodic protection system. According to a preferred embodiment of the invention connection bolts between the cup and pipeline are used, these being inserted through and left in some of the centering holes 5 before injecting the resin. That end of the bolt in contact with the pipeline is fitted with a terminal providing good electrical connection, such as an aluminium plate.

A further advantage of the invention is that the pipeline can be repaired in a short time, without having to interrupt its normal operation and without having to weld to the actual pipeline.

We claim:

1. A method for repairing local damage to pipelines by applying cladding or cups with a protective sheath interposed, the method comprising the steps of:

applying two cylindrical half-shells to an outer surface of a pipeline and then joining together edges of the two cylindrical half-shells to form a cylindrical cup around the pipeline;

positioning a circular gasket at each of two ends of the cup in correspondence with a circular projection provided on an inside of each of the two cup ends, said gasket being formed with an inclined bearing surface which matches a surface of the projection;

compressing the two gaskets against the projections and against the outer surface of the pipeline by tie bars applied to terminal flanges positioned at the two ends of the cup, to form a pressure-tight interspace about a damaged portion of the pipeline;

injecting a resin mixture through an injection valve into said interspace to completely fill said interspace and expel air through a vent valve;

closing the vent valve when the resin mixture begins to escape through the vent valve;

continuing an injection of the resin mixture through the injection valve into said interspace until a substantial gauge pressure is obtained within said interspace so as to put the cup in a state of substantial tension and the pipeline in a state of compression; and closing the injection valve and leaving the injected resin mixture to harden, such that a release of stresses induced in walls of the cup and pipeline enable resin shrinkage during hardening to be compensated, to obtain continuity between the cup, the hardened resin and the pipeline.

2. A method for repairing local damage to pipelines as claimed in claim 1, wherein the injection gauge pressure is between 20 and 60 bar.

3. A method for repairing local damage to pipelines as claimed in claim 1, wherein the tie bars are threaded bars and the gaskets are compressed by tightening with the threaded bars which connect together the terminal flanges at the two ends of the cup.

4. A method for repairing local damage to pipelines as claimed in claim 1, wherein the tie bars are threaded bars and the gaskets are compressed by tightening with the threaded bars which connect each of the terminal flanges at the two ends of the cup to backing flanges provided on the corresponding ends of the cups.

5. A method for repairing local damage to pipelines as claimed in claim 1, wherein the resin used for the injection is an epoxy resin used with a hardener, preferably of an amine type.

6. A method for repairing local damage to pipelines as claimed in claim 1, wherein the resin used for the injection is polymerized within the interspace and consists of one from the group comprising acrylic, vinyl and allyl liquid used with a catalyst which is able to generate free radicals and consisting of one from the group comprising organic percarbonates, peroxides and hydroperoxides.

7. A method for repairing local damage to pipelines as claimed in claim 2, wherein the injection gauge pressure is between 30 and 45 bar.

* * * * *